(12) United States Patent
Jiang

(10) Patent No.: US 12,256,279 B2
(45) Date of Patent: Mar. 18, 2025

(54) CELL RESELECTION METHOD, INFORMATION TRANSMISSION METHOD, AND COMMUNICATION DEVICE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 491 days.

(21) Appl. No.: 17/793,899

(22) PCT Filed: Jan. 20, 2020

(86) PCT No.: PCT/CN2020/073276
§ 371 (c)(1),
(2) Date: Jul. 19, 2022

(87) PCT Pub. No.: WO2021/146852
PCT Pub. Date: Jul. 29, 2021

(65) Prior Publication Data
US 2023/0056855 A1    Feb. 23, 2023

(51) Int. Cl.
H04W 4/00       (2018.01)
H04W 36/00      (2009.01)
H04W 36/06      (2009.01)
H04W 36/30      (2009.01)

(52) U.S. Cl.
CPC ....... H04W 36/06 (2013.01); H04W 36/0072 (2013.01); H04W 36/13 (2023.05); H04W 36/302 (2023.05)

(58) Field of Classification Search
CPC . H04W 36/06; H04W 36/0072; H04W 36/13; H04W 36/302; H04W 48/12; H04W 48/18; H04W 36/0061
USPC .......................................................... 370/331
See application file for complete search history.

(56) References Cited

U.S. PATENT DOCUMENTS

| | | | | |
|---|---|---|---|---|
| 10,009,800 B2* | 6/2018 | Hahn | .................... | H04W 76/27 |
| 11,399,338 B2* | 7/2022 | Liu | ....................... | H04W 60/04 |
| 11,496,934 B2* | 11/2022 | Tao | .................... | H04W 36/324 |
| 11,606,751 B2* | 3/2023 | Lee | ........................ | H04W 76/28 |
| 11,611,912 B2* | 3/2023 | Han | ........................ | H04W 4/06 |

(Continued)

FOREIGN PATENT DOCUMENTS

| | | |
|---|---|---|
| CN | 108513322 A | 9/2018 |
| CN | 109831807 A | 5/2019 |

(Continued)

OTHER PUBLICATIONS

PCT/CN2020/073276 English translation of International Search Report dated Oct. 28, 2020, 2 pages.

(Continued)

*Primary Examiner* — Amancio Gonzalez
(74) *Attorney, Agent, or Firm* — Cozen O'Connor

(57) ABSTRACT

Provided are a cell reselection method and apparatus, an information transmission method and apparatus, a communication device, and a storage medium. The cell reselection method is applied to a terminal, and comprises: receiving first priority information of a frequency point and a network slice combination supported by the frequency point; and performing cell reselection according to the first priority information.

24 Claims, 5 Drawing Sheets

(56) References Cited

U.S. PATENT DOCUMENTS

2022/0346002 A1* 10/2022 Fu .................. H04W 48/20
2022/0353772 A1* 11/2022 Li .................. H04L 5/0051

FOREIGN PATENT DOCUMENTS

| EP | 3534649 A1 | 9/2019 |
| EP | 3589016 A1 | 1/2020 |
| EP | 3627863 A1 | 3/2020 |
| WO | WO 2018228294 A1 | 12/2018 |

OTHER PUBLICATIONS

ZTE et al. "Service based cell reselection in idle mode and inactive state" 3GPP TSG-RAN WG2 Meeting#101bis R2-1804453; Apr. 2018; 3 pages.
VIVO "Cell selection / reselection with network slicing" 3GPP TSG-RAN WG2 NR Ad hoc 1801 R2-1800855; Jan. 2018; 3 pages.
European Patent Application No. 20915925.0, Search and Opinion dated Jul. 20, 2023, 14 pages.
ZTE "Idle mode behaviour for NW slice" 3GPP TSG-RAN WG2 Meeting #99, R2-1708109, Aug. 2017, 4 pages.

* cited by examiner

CELL RESELECTION METHOD, INFORMATION TRANSMISSION METHOD, AND COMMUNICATION DEVICE

CROSS-REFERENCE TO RELATED APPLICATION

This application is a U.S. national phase of International Application No. PCT/CN2020/073276, filed with the State Intellectual Property Office of P. R. China on Jan. 20, 2020.

TECHNICAL FIELD

The disclosure relates to, but is not limited to a field of wireless communication technologies, and particularly to a cell reselection method, an information transmission method, and a communication device.

BACKGROUND

A network slicing technology is introduced in 5G. The technology allows a network (a core network and/or an access network) to be divided into multiple network slices, so that different services are transmitted in different network slices without interfering with each other.

A terminal may perform a cell reselection based on a position of the terminal during a movement. However, in sometimes a cell selected by the terminal cannot provide a network slice required by the terminal. This may result in poor communication quality at the terminal, or result in the terminal frequently performing cell reselection due to the network slice.

SUMMARY

According to a first aspect of embodiments of the disclosure, a cell reselection method is provided. The method is applied in a terminal and includes: receiving first priority information of a combination of a frequency point and a network slice supported by the frequency point; and performing a cell reselection based on the first priority information.

According to a second aspect of the embodiments of the disclosure, an information transmission method is provided. The method is applied in a base station and includes issuing first priority information of a combination of a frequency point and a network slice supported by the frequency point, in which the first priority information is used by a terminal for a cell reselection.

According to a third aspect of the embodiments of the disclosure, a communication device is provided. The communication device includes: an antenna, a memory and a processor. The processor is coupled to the antenna and the memory respectively, and configured to execute executable programs stored in the memory to control the antenna to receive and send wireless signals and perform steps of the cell reselection method according to the first aspect or the information transmission according to the second aspect.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms used in the embodiments of the disclosure are only for the purpose of describing particular embodiments, but should not be construed to limit the embodiments of the disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure. As used herein, the term "if" may be construed to mean "when" or "upon" or "in response to determining" or "in accordance with a determination" or "in response to detecting," that a stated condition precedent is true, depending on the context.

Figure 1:
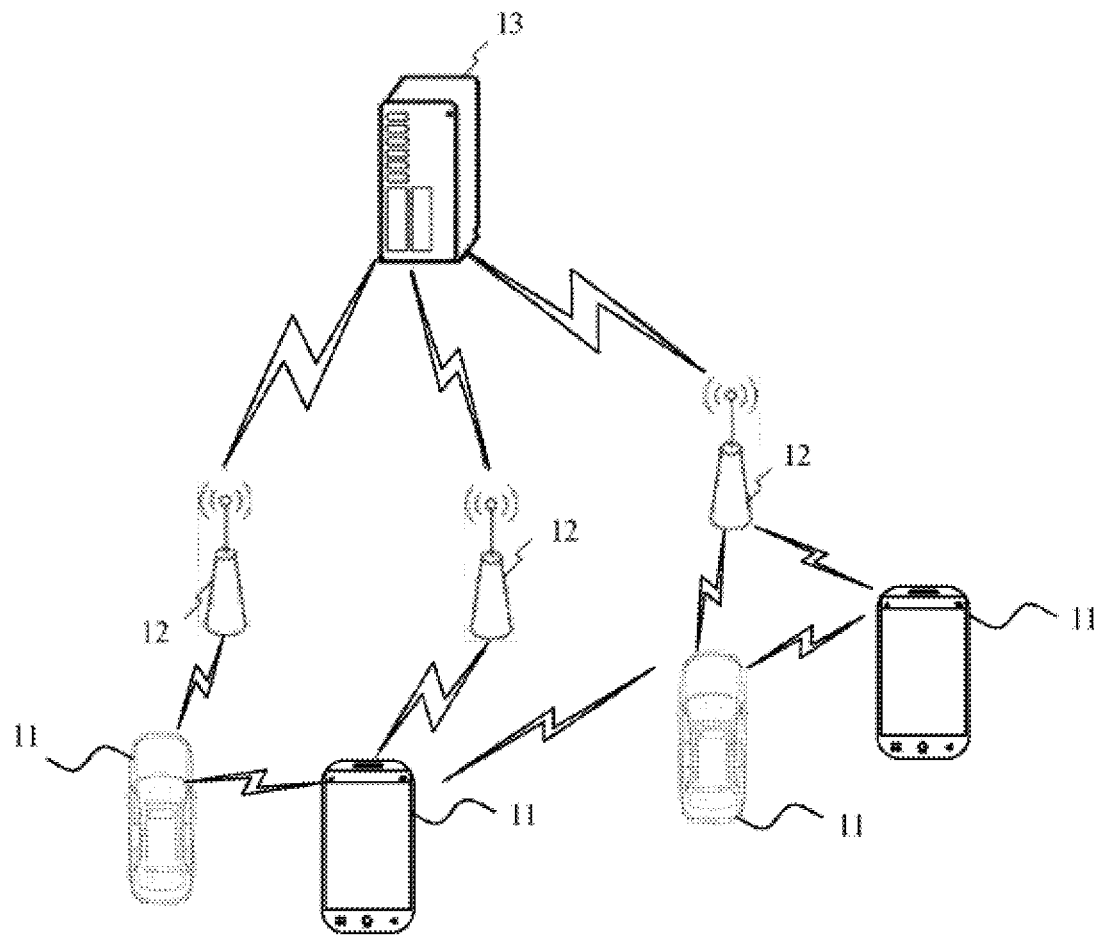
FIG. 1 is a schematic diagram illustrating a wireless communication system according to an embodiment.

With reference to FIG. 1, FIG. 1 is a schematic diagram illustrating a wireless communication system according to an embodiment. As illustrated in FIG. 1, the wireless communication system is a communication system based on the cellular mobile communication technology. The wireless communication system may include several terminals 11 and several base stations 12.

The terminal 11 may be a device that provides voice and/or data connectivity to a user. The terminal 11 can communicate with one or more core networks via a radio access network (RAN). The terminal 11 can be an IoT terminal, such as a sensor device, a mobile phone (or a cellular phone), and a computer having an IoT terminal, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be an in-vehicle device, for example, the terminal 11 may be a vehicle-mounted computer with a wireless communication function, or a wireless communication device externally connected to a vehicle-mounted computer. Alternatively, the terminal 11 may also be a roadside device, for example, a road light with a wireless communication function, a traffic light or other roadside devices and so on.

The base station 12 may be a network side device in the wireless communication system. The wireless communication system may be a 4th generation mobile communication (4G) system, also known as the long term evolution (LTE) system. Alternatively, the wireless communication system may also be a 5G system, also known as the new radio (NR) system. Alternatively, the wireless communication system may also be a next-generation system of the 5G system. An access network in the 5G system may be called as a new generation radio access network (NG-RAN), or a machine-type communication (MTC) system.

The base station 12 may be an evolved base station (eNB) adopted in the 4G system. Alternatively, the base station 12 may also be a base station (gNB) adopting a centralized and distributed architecture in the 5G system. When the base station 12 adopts the centralized distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 12.

A wireless connection can be established between the base station 12 and the terminal 11 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

In some embodiments, an end to end (E2E) connection can be established between the terminals 11, for example a vehicle to vehicle (V2V) communication, a vehicle to infrastructure (V2I) communication, vehicle to pedestrian (V2P) communication and other scenarios in the vehicle to everything (V2X) communication.

Alternatively, the wireless communication system may further include a network management device 13.

A plurality of the base stations 12 are connected to the network management device 13 respectively. The network management device 13 may be a core network device in the wireless communication system. For example, the network management device 13 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 13 is not limited in the embodiment of the disclosure.

Figure 2:
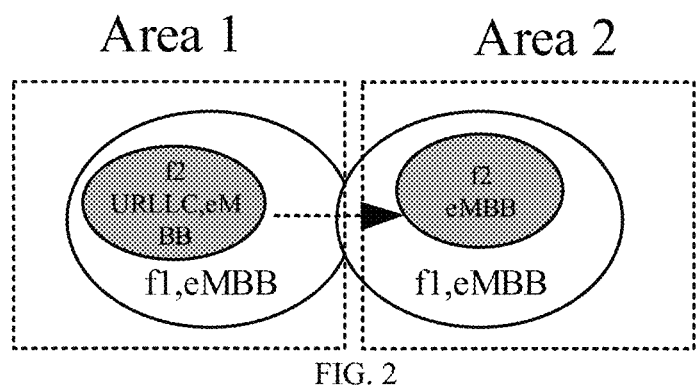
FIG. 2 is a schematic diagram illustrating a frequency point and a network slice selected by a cell according to an embodiment.

As illustrated in FIG. 2, in area 1, it is desired that the enhance mobile broadband only (eMBB only) UE preferentially resides in f1, because f2 supports the ultra-reliable low latency communications conference (URLLC) and preferentially provides service for the URLLC UE. However, in area 2, the eMBB only UE preferentially resides in f2, because f2 includes a big bandwidth and preferentially provides service for eMBB services.

For area 1, the network configures a fixed frequency priority f1>f2 for the eMBB only UE through a dedicated signaling. When the UE moves from area 1 to area 2, the dedicated priority is not applicable. The problem cannot be solved in the related art. Thus, a priority mode which is applicable to a UE slice type is required.

In the following embodiments, UE is also called as terminal.

Figure 3:
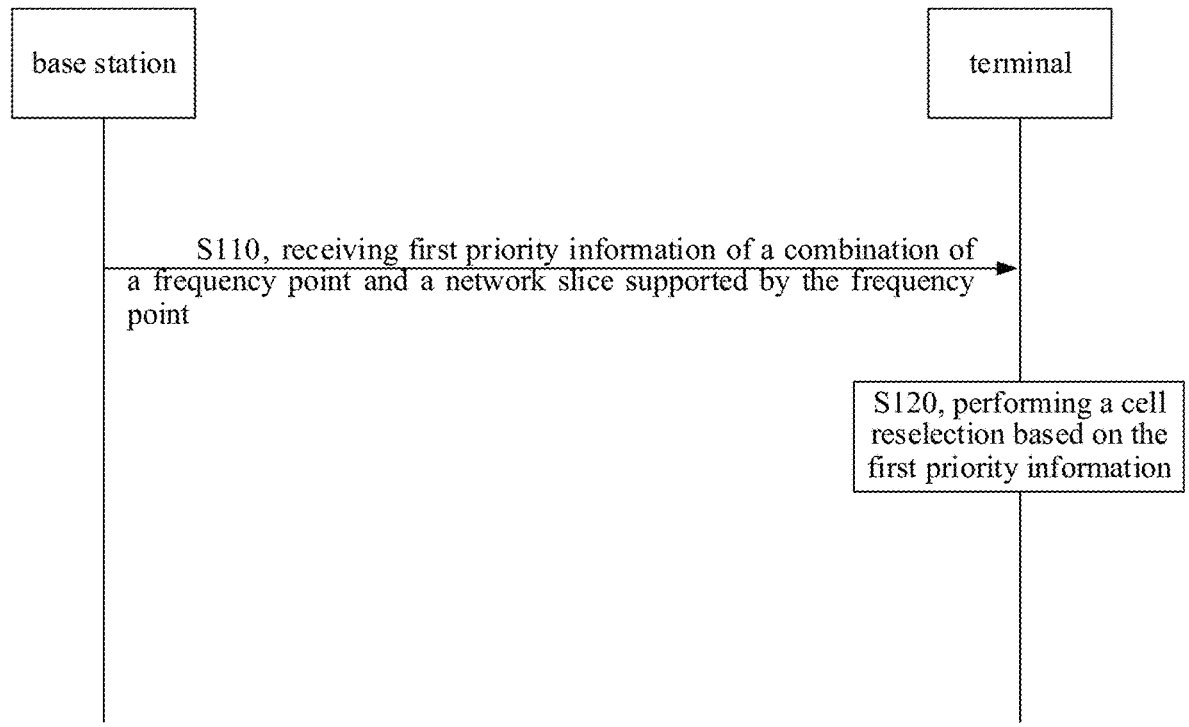
FIG. 3 is a flowchart illustrating a cell reselection method according to an embodiment of the disclosure.

As illustrated in FIG. 3, the embodiments of the disclosure provide a cell reselection method, which is applied in a terminal and includes the followings.

At block S110, first priority information of a combination of a frequency point and a network slice supported by the frequency point is received.

At block S120, a cell reselection is performed based on the first priority information.

In the embodiments of the disclosure, the method can be applied in various terminals supporting network slices. The terminals may include normal terminals, IoT terminals, vehicle-mounted terminals or light-weight terminals. The normal terminals may include mobile phones and the like, for another example, long term evolution (LTE) terminals or the like.

In the embodiments of the disclosure, the terminal may receive the first priority information from a base station. The first priority information here is priority information of a combination of a frequency point and a network slice supported by the frequency point, indicating a combined priority of the frequency point and the network slice supported by the frequency point.

In the embodiments of the disclosure, the base station issues the first priority information to the terminal, and the terminal performs the cell reselection in consideration of the first priority information corresponding to the priority of a combination of a frequency point and a network slice supported by the frequency point rather than merely based on a cell priority or a frequency point priority, such that the reselection of a resident cell of the terminal may reduce occurrence of a phenomenon where a resident cell of the terminal cannot provide a network slice required or supported by the terminal and which may cause that a communication quality of the terminal cannot reaches expectations, thus improving the communication quality.

In some embodiments, the method further includes determining the network slice supported by the frequency point based on slice information. The slice information includes single network slice selection auxiliary information, slice type information or service type information.

In the embodiments of the disclosure, the slice information may include any information indicating a network slice, including but not limited to identification information.

For example, the slice information may include the single network slice selection auxiliary information, the slice type information or the service type information.

The single network slice selection auxiliary information may be configured as one kind of network slice identification.

The slice type information indicates a type of a network slice.

The service type information may indicate a type of a service which can be provided by a network slice.

Different service types correspond to different business types.

Figure 4:
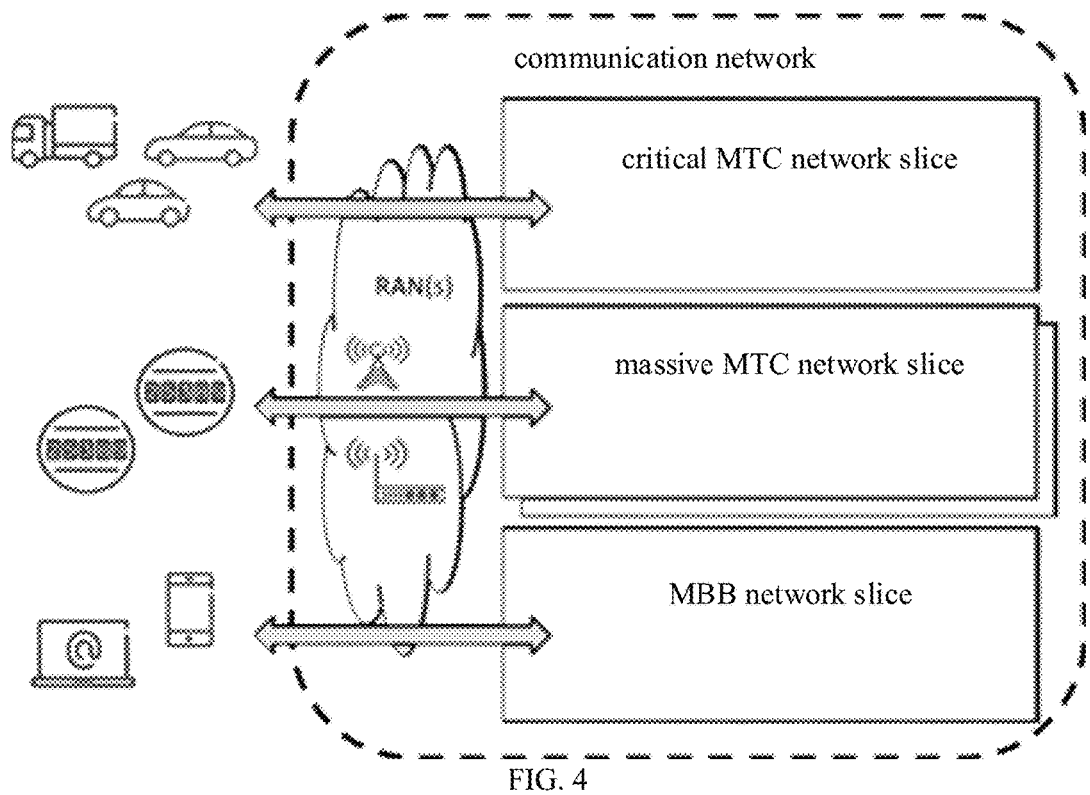
FIG. 4 is a schematic diagram illustrating a network slice according to an embodiment of the disclosure.

Some communication networks may provide network slices supporting different business types. As illustrated in FIG. 4, three different business types (critical MTC type business, such as data of a health monitoring device; massive MTC type business, such as meter reading business; MBB (Mobile Broadband) type business, such as video type business) are divided into three network slices. The respective network slices may have different accounting strategies, safety strategies, quality of service (QoS) strategies and the like. A congestion of large-scale businesses in one network slice has no effect on normal operation of services in other network slices.

In detail, when performing the cell reselection, block S120 may include determining a target cell in the cell reselection based on a priority of a frequency point of a serving cell of the terminal and a network slice supported by the frequency point, a priority of a frequency point of a neighbor cell of and a network slice supported by the frequency point, a signal quality of the serving cell and a signal quality of the neighbor cell. Both the priority of the frequency point of the serving cell and the network slice supported by the frequency point of the serving cell and the priority of the frequency point of the neighbor cell and the network slice supported by the frequency point of the neighbor cell are indicated by the above-mentioned first priority information. The neighbor cell here includes but is not limited to one or more cells adjacent to the serving cell of the terminal in intra-system intra-frequency cells, intra-system inter-frequency cells and inter-system cells.

For example, a cell with a high priority and a high signal quality is preferentially selected as the target cell in the cell reselection.

In some embodiments, block S120 may include: for a reselection of an intra-system inter-frequency cell and an intra-system intra-frequency cell, determining a signal quality of each of the intra-system inter-frequency cell and the intra-system intra-frequency cell with a same priority based on the first priority information; and determining the intra-system inter-frequency cell or the intra-system intra-frequency cell with a maximum signal quality as a target cell in the cell reselection.

The intra-system inter-frequency cells refer to cells supporting different frequency points in a same communication system.

The intra-system intra-frequency cells refer to cells supporting a same frequency point in a same communication system.

Here, the same communication system may be systems adopting a same communication mode. For example, the 3G system, the 4G system and the 5G system are considered as different communication systems.

Here, the intra-system inter-frequency cell and the intra-system intra-frequency cell are neighbor cells of the serving cell. Since these cells belong to the same system, the cells have may the same priority of the combination of a frequency point and a network slice supported by the frequency point corresponding to the first priority information.

If the first priority information indicates the same priority, the target cell in the cell reselection is determined based on the signal quality.

The signal quality may be a signal quality of a cell, including but not limited to a received signal strength, a received signal power, a signal to noise radio of the terminal or the like.

A cell with a maximum signal quality is selected as the target cell in the cell reselection. In this way, on one hand, it is ensured that the reselected cell can provide the network slice required or supported by the terminal to the terminal, on the other hand, the target cell selected based on the signal quality may ensure a transmission quality of wireless signals.

In some embodiments, block S120 may include: for a reselection of an intra-system inter-frequency cell, an intra-system intra-frequency cell and an inter-system cell, determining based on the first priority information whether a cell with a priority higher than a priority of a serving cell of the terminal exists in the intra-system inter-frequency cell, the intra-system intra-frequency cell and the inter-system cell; and determining a cell with a priority higher than the priority of the serving cell of the terminal and a signal quality higher than a first threshold as a target cell in the cell reselection in response to existence of a cell with a priority higher than the priority of the serving cell of the terminal.

Here, the inter-system cells refer to cells of different communication systems. For example, if the serving cell is a 4G cell, the inter-system cell of the serving cell may be a cell in a communication system different from 4G, including a 5G cell, a 3G cell or a 2G cell.

If the neighbor cells of the serving cell includes the intra-system inter-frequency cell, the intra-system intra-frequency cell and the inter-system cell, these cells can be configured as candidate cells in the cell reselection. In this case, one cell with a priority higher than the priority of the serving cell may be selected as a serving cell in the cell reselection based on the first priority information.

In the embodiments of the disclosure, if it is determined based on the first priority information that the priority of the intra-system inter-frequency cell, the intra-system intra-frequency cell or the inter-system cell is higher than the priority of the serving cell, the cell with a priority higher than the priority of the serving cell and a signal quality higher than the first threshold is selected as the target cell in the cell reselection.

In some embodiments, block S120 may include: for a reselection of an intra-system inter-frequency cell, an intra-system intra-frequency cell and an inter-system cell, determining based on the first priority information whether a cell with a priority higher than or equal to a priority of a serving cell of the terminal exists in the intra-system inter-frequency cell, the intra-system intra-frequency cell and the inter-system cell; and in response to inexistence of a cell with a priority higher than or equal to the priority of the serving cell of the terminal, when a signal quality of the serving cell is less than a second threshold and a cell with a signal quality higher than a third threshold exists in the intra-system inter-frequency cell, the intra-system intra-frequency cell and the inter-system cell, determining a cell with a signal quality higher than the third threshold as a target cell in the cell reselection.

Here, the third threshold is less than the second threshold. Here, the second threshold may be equal to the third threshold, i.e., it is not limited to that the third threshold is less than the second threshold.

In some embodiments, the third threshold may be lower than the first threshold slightly. But in a specific implementation, it is not limited to that the third threshold is less than the first threshold. In this way, when a cell with a priority higher than or equal to the priority of the serving cell exists, a requirement on the signal quality may be reduced to implement a balance of the signal quality and the selection of the provided network slice.

In some embodiments, block S120 may include: in response to a signal quality of the serving cell being higher than a fourth threshold, determining based on the first priority information whether a priority of a network slice supported by an intra-system intra-frequency cell is higher than a priority of a network slice supported by a serving cell of the terminal; performing a signal quality measurement on the intra-system intra-frequency cell in response to the priority of the network slice supported by the intra-system intra-frequency cell being higher than the priority of the network slice supported by the serving cell; and selecting the intra-system intra-frequency cell as a target cell in the cell reselection based on a result of the signal quality measurement.

The embodiment relates to a signal quality measurement of a cell. If the signal quality of the serving cell is good, the signal quality of the serving cell is higher than the four threshold. Here, the four threshold may be equal to the above-mentioned first threshold, but it is not limited to that.

In this case, it is determined whether there is an intra-system intra-frequency cell having a priority higher than the priority of the serving cell, if yes, the signal quality measurement of the intra-system intra-frequency cell is performed, so that unnecessary signal measurement can be reduced, thus reducing power consumption produced by the terminal due to an intra-frequency measurement of a neighbor cell. If there is no intra-system intra-frequency cell having a priority higher than the priority of the serving cell, it is unnecessary to perform the signal quality measurement of the intra-system intra-frequency cell.

If the signal quality measurement is performed, the target cell in the cell reselection is determined based on the result of the signal quality measurement.

In the embodiments of the disclosure, when the target cell in the cell reselection is selected based on the result of the signal quality measurement, the signal quality of the signal quality measurement may be used as a reference factor. In detail, when the terminal performs the cell reselection, a load balancing phenomenon of different cells may be considered.

In some embodiments, block S120 may include: determining based on the first priority information whether a priority of an intra-system inter-frequency cell and a priority of an inter-system cell is higher than a priority of a serving cell of the terminal, in response to a signal quality of the serving cell being higher than a fifth threshold; performing a signal quality measurement on the intra-system inter-frequency cell and the inter-system cell in response to the priority of the intra-system inter-frequency cell and the priority of the inter-system cell being higher than the priority of the serving cell; and selecting the intra-system inter-frequency cell or the inter-system cell as a target cell in the cell reselection based on a result of the signal quality measurement.

Here, the fifth threshold may be equal to the above-mentioned fourth threshold, but is not limited to that.

In some embodiments, selecting the intra-system inter-frequency cell or the inter-system cell as a target cell in the cell reselection based on a result of the signal quality measurement may include selecting the intra-system inter-frequency cell or the inter-system cell with a higher signal quality as a target cell in the cell reselection based on a result of the signal quality measurement.

In some other embodiments, selecting the intra-system inter-frequency cell or the inter-system cell as a target cell in the cell reselection based on a result of the signal quality measurement may include selecting the intra-system inter-frequency cell or the inter-system cell with a signal quality higher than a predetermined threshold and a load rate less than a load threshold as a target cell in the cell reselection based on a result of the signal quality measurement.

In some embodiments, if it is determined based on the first priority information that there is an intra-system inter-frequency cell or an inter-system cell having a priority higher than the priority of the serving cell, an inter-signal measurement may be performed. If it is determined based on the first priority information that there is no intra-system inter-frequency cell or inter-system cell having a priority higher than the priority of the serving cell, no inter-signal measurement is performed on the intra-system inter-frequency cell or the inter-system cell, such that unnecessary signal measurement can be reduced, thus reducing power consumption of the terminal.

Since the inter-system of a system typically adopts a frequency band different from the system, so that the inter-system cell and the serving cell support different frequency points. Thus, the inter-system cell belongs to an inter-frequency cell.

In some embodiments, the method may further include: performing no signal quality measurement on the intra-system inter-frequency cell or the inter-system cell in response to the priority of the intra-system inter-frequency cell and the priority of the inter-system cell being less than the priority of the serving cell.

Figure 5:
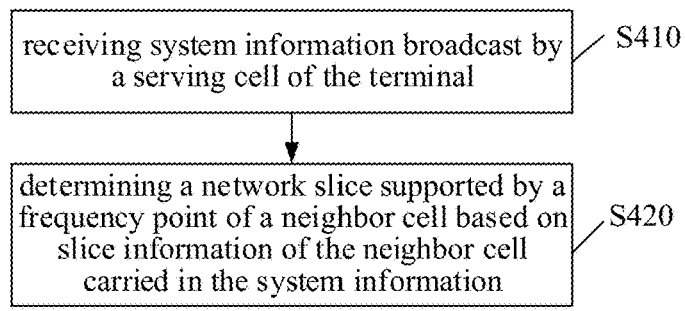
FIG. 5 is a flowchart illustrating a cell reselection method according to an embodiment of the disclosure.

In some embodiments, as illustrated in FIG. 5, the method may further include the followings.

At block S410, system information broadcast by a serving cell of the terminal is received.

At block S420, a network slice supported by a frequency point of a neighbor cell is determined based on slice information of the neighbor cell carried in the system information. Here, the first priority information at least indicates a priority of a combination of the frequency point of the neighbor cell and the network slice supported by the frequency point of the neighbor cell.

In the embodiment, the system information may be broadcast by the serving cell of the terminal, and the slice information of the network slice supported by the frequency point of the neighbor cell may be obtained from the system information of the serving cell of the terminal, so that the terminal needs not to receive the slice information of the network slice supported by the frequency point of the neighbor cell from the neighbor cell.

For example, block S410 may include at least one of: receiving intra-system intra-frequency cell reselection system information broadcast by the serving cell, in which the intra-system intra-frequency cell reselection system information carries slice information of an intra-system intra-frequency cell; receiving intra-system inter-frequency cell reselection system information broadcast by the serving cell, in which the intra-system inter-frequency cell reselection system information carries slice information of an intra-system inter-frequency cell; and receiving inter-system cell reselection system information broadcast by the serving cell, in which the inter-system cell reselection system information carries slice information of an inter-system cell.

The intra-system intra-frequency cell reselection system information may be system information carrying reselection information for selecting an intra-system intra-frequency cell, for example, carrying a reselection threshold or the like.

The intra-system inter-frequency cell reselection system information may be system information carrying reselection information for selecting an intra-system inter-frequency cell, for example, carrying a reselection threshold or the like.

The inter-system cell reselection system information may be system information carrying reselection information for selecting an inter-system inter-frequency cell, for example, carrying a reselection threshold or the like.

In some embodiments, the intra-system intra-frequency cell reselection system information includes but is not limited to system information block SIB3. The intra-system inter-frequency cell reselection system information may include but be not limited to SIB4. The inter-system cell reselection system information includes but is not limited to SIB5.

In some embodiments, block S120 may include: determining an intra-system inter-frequency cell corresponding to the slice information carried in the system information as a candidate cell in the cell reselection based on the first priority information; and/or determining an inter-system cell corresponding to the slice information carried in the system information as a candidate cell in the cell reselection based on the first priority information.

When performing the cell reselection based on the first priority information, the candidate cell in the cell reselection determined based on the first priority information includes the intra-system intra-frequency cell, the intra-system inter-frequency cell and the inter-system cell whose slice information is carried in the system information sent by the serving cell, so that occurrence of a phenomenon where the cell reselected through the cell reselection performed within all cells is not applicable may be reduced.

In some embodiments, the method may further include: receiving a first indication broadcast by the serving cell, in which the first indication is configured to indicate whether the system information broadcast by the serving cell is capable of carrying the slice information.

Determining the network slice supported by the frequency point of the neighbor cell based on the slice information carried in the system information includes: determining that the frequency point of the neighbor cell and the frequency point of the serving cell support a same network slice in response to receiving the first indication and the system information carrying no slice information of the neighbor cell.

In the embodiment of the disclosure, the first indication may be any broadcast message, for example broadcast system information or the like.

The first indication is broadcast within the serving cell. Here, the first indication may indicate whether the serving cell carries the slice information of the network slice supported by the frequency point of the neighbor cell in the system information.

Even the terminal receives the first indication, the system information received by the serving cell may carry the slice information or may not carry the slice information. If the first indication is received but the system information does not carry the slice information, it is determined that the network slice supported by the frequency point of the neighbor cell and the network slice supported by the frequency point of the serving cell are the same. If the system information carries the slice information, slice information of the network slice supported by the frequency point of the neighbor cell is determined based on the slice information.

In some embodiments, the method may further include: receiving a second indication broadcast by the serving cell in response to the serving cell supporting broadcasting of the second indication, in which the second indication is configured to indicate that the frequency point of the neighbor cell and the frequency point of the serving cell support different network slices.

If the first indication and the second indication are received, the network slice supported by the frequency point of the neighbor cell is determined based on the slice information of the neighbor cell carried in the system information. In some embodiments, the second indication may be broadcast within the serving cell. The second indication is configured to indicate that the frequency point of the serving cell and the frequency cell of the neighbor cell support different network slices.

If the first indication is received but the second indication is not received, and the system information does not carry the slice information of the neighbor cell, it is determined that the frequency point of the serving cell and the frequency cell of the neighbor cell support the same network slice.

In some embodiments, the method further includes: determining that the frequency point of the neighbor cell and the frequency point of the serving cell support a same network slice in response to not receiving the second indication. That is, if the second indication is not received, it is determined by default that the frequency point of the serving cell and the frequency cell of the neighbor cell support the same network slice.

For example, determining that the frequency point of the neighbor cell and the frequency point of the serving cell support the same network slice in response to not receiving the second indication includes determining that the frequency point of the neighbor cell and the frequency point of the serving cell support a same network slice in response to receiving the first indication, not receiving the second indication and the system information carrying no slice information of the neighbor cell.

In some embodiments, the first indication and/or the second indication may include only one bit, and can be broadcast in the system information at different time.

In some embodiments, the method further includes: determining the network slice supported by the frequency point of the neighbor cell without based on the system information, in response to the serving cell not supporting broadcasting of the second indication.

When the UE does not receive the second indication broadcast by the base station within the serving cell, the UE does not determine the network slice supported by the frequency point of the neighbor cell based on the system information. For example, in this case, the UE may determine the network slice supported by the frequency point of the neighbor cell based on slice information sent by the neighbor cell.

In some embodiments, receiving the first priority information of a combination of a frequency point and a network slice supported by the frequency point includes: receiving the first priority information in response to a tracking area update (TAU) of the terminal or a radio access network area update (RAU).

TAU refers to an update of an area where the core network is located, while RAU refers to an update of an area where the wireless network is located. Generally, the tracking area (TA) corresponding to TAU is bigger than the notification area (NA) corresponding to RAU.

In response to TAU or RAU, the first priority information is received, so that the cell reselection may be performed based on the first priority information when performing the cell reselection in the TA or NA.

For example, the first priority information is carried in a completion message or acknowledge message of TAU or RAU. In this way, the reception of the first priority information is completed when the terminal receives the completion message or acknowledge message of TAU or RAU.

In some embodiments, receiving the first priority information of a combination of a frequency point and a network slice supported by the frequency point includes: receiving radio source control (RRC) release information carrying the first priority information in response to the terminal releasing a RRC connection.

In some embodiments, the terminal is switched from a connected state to an idle state or an inactive state when the terminal releases the RRC connection through the RRC connection release message. In this way, when the terminal enters the connected state again, the cell reselection is performed, so that the selection of a cell associated with the network slice may be performed based on the first priority information carried in the RRC connection release message timely.

In the embodiment of the disclosure, the first priority information corresponding to the frequency point and the network slice supported by the frequency point is not sent via a dedicated message, but the first priority information is received through information used in existing procedures, thus having a high compatibility with the prior art and reducing unnecessary reception of the terminal. Further, the first priority information is received in the TAU, RAU and connection release message, so that the first priority information can be used immediately when performing the next cell reselection, thus reducing latency.

When the UE supports various network slices, the network which is accessed by the UE preferentially is controlled by the network based on a frequency priority. The selection of the frequency priority is determined at the network side. However, the network may not know the occurring frequency of each network slice of the terminal, and the network may configure a frequency on which the occurring frequency of the network slice is low for the terminal, which may cause that the terminal needs to access another frequency once the UE has a network slice service with a high frequency and then switches to the frequency supported by the network, thus bringing unnecessary switching.

In some embodiments, the method further includes: reporting second priority information of a network slice supported by the terminal, in which the second priority information is configured to determine priority information of the frequency point and priority information of the network slice supported by the frequency point, or the second priority information is configured to determine the first priority information of the combination of the frequency point and the network slice supported by the frequency point.

In some cases, the terminal may support a specific network slice or not support the specific network slice based on its own software and hardware capability. In some other cases, the terminal may support one or more network slices and/or not support one more network slices due to a subscription condition of communication services.

In such scenario, the terminal may configure a priority for the network slice supported by itself based on a matching degree between its capability and the network slice, a service occurring frequency and/or payments. The priority may be indicated by the second priority information. Here, the second priority information is the priority of the network slice supported by the terminal.

After the terminal reports the second priority information of the network slice supported by itself, the network side device (such as base station) may configure the first priority information of the combination the frequency point and the network slice supported by the frequency point for the terminal based on the second priority information of the network slice reported by the terminal.

Typically, the priority of the frequency point is positively correlated to the priority indicated by the second priority information corresponding to the network slice supported by the frequency point. The positive correlation includes a positive proportional correlation.

Accordingly, the terminal supporting different network slices has different first priority information for the same frequency point and the supported network slice, such that a configuration of the first priority information in UE granularity may be realized.

In some embodiments, the method further includes: determining the second priority information of the network slice or a network slice group supported by the terminal based on a service occurring frequency on the network slice.

The service occurring frequency may include the number of using a certain service in a time unit, or traffic generated by the certain service in a time unit.

In some embodiments, the priority of the frequency point is positively correlated with the priority of the network slice supported by the frequency point, or the priority of the frequency point is positively correlated with the priority of the combination of the frequency point and the network slice supported by the frequency point.

In some embodiments, the method further includes: receiving priority request information.

Reporting the second priority information of the network slice supported by the terminal includes reporting the second priority information of the network slice supported by the terminal based on the priority request information.

In some cases, the second priority information is reported by the terminal actively. In some other cases, the second priority information is reported based on an indication or request of the base station. For example, the base station instructs the terminal to report the second priority information by issuing the priority request information.

In some embodiments, reporting the second priority information of the network slice supported by the terminal includes reporting updated second priority information of the network slice supported by the terminal in response to an update of a priority of the network slice supported by the terminal.

The second priority information is reported when the priority of the network slice supported by the terminal is updated, such that unnecessary reporting can be reduced.

In some embodiments, the method further includes: reporting a third indication in response to an update of a priority of the network slice supported by the terminal or an expiration of a first timer.

Receiving the priority request information includes: receiving the priority request information issued based on the third indication.

For example, the base station may instruct the terminal to configure with the first timer through the RRC message or MAC signaling. The terminal reports the third indication when the first timer expires based on the timing of the first timer. After receiving the third indication, the base station may select an appropriate timing to issue the priority request information based on its communication condition or requirements.

In some embodiments, reporting the second priority information of the network slice supported by the terminal includes reporting the second priority information of the network slice supported by the terminal in response to an expiration of a second timer.

Similarly, the base station may instruct the terminal to configure with the second timer through the RRC message or MAC signaling. The terminal reports the second priority information actively when the second timer expires based on the timing of the second timer.

In some embodiments, the first timer and the second timer may be different timers, have different timing lengths and/or different timing starting time.

In some other embodiments, the first timer and the second timer may be a same timer, so that the base station only needs to configure one timer for the terminal, and the UE merely needs to maintain one timer, which simplifies timing work.

In some embodiments, reporting the second priority information of the network slice supported by the terminal includes: switching the terminal to a connected state in response to the terminal being in an idle state or an inactive state and an update of the priority of the network slice supported by the terminal; and reporting updated second priority information of the network slice supported by the terminal during the switching to the connected state.

In the embodiment, if the terminal is in the idle state or the inactive state and a change of the priority of the network slice supported by the terminal is monitored, i.e., the priority of the network slice supported by the terminal is updated, the terminal is automatically switched to the connected state, such that the updated second priority information may be reported timely, thus facilitating the update of the first priority information of the terminal at the network side.

In some embodiments, reporting updated second priority information of the network slice supported by the terminal during the switching to the connected state includes: reporting the updated second priority information of the network slice using a connection establish request message during the switching to the connected state, or reporting the updated second priority information of the network slice using a connection establish completion message during the switching to the connected state, or reporting the updated second priority information of the network slice using a connection recovery request message during the switching to the connected state, or reporting the updated second priority information of the network slice using a connection recovery completion message during the switching to the connected state.

In summary, in the embodiment, the updated second priority information is reported using a connection message during the switching to the connected state, so that no new message is introduced to report the second priority information, which on one hand has a high compatibility with the prior art and on the other hand competes reporting of the second priority information once the terminal is switched to the connected state.

In some other embodiments, the second priority information may be reported during a terminal attach procedure.

Figure 6:
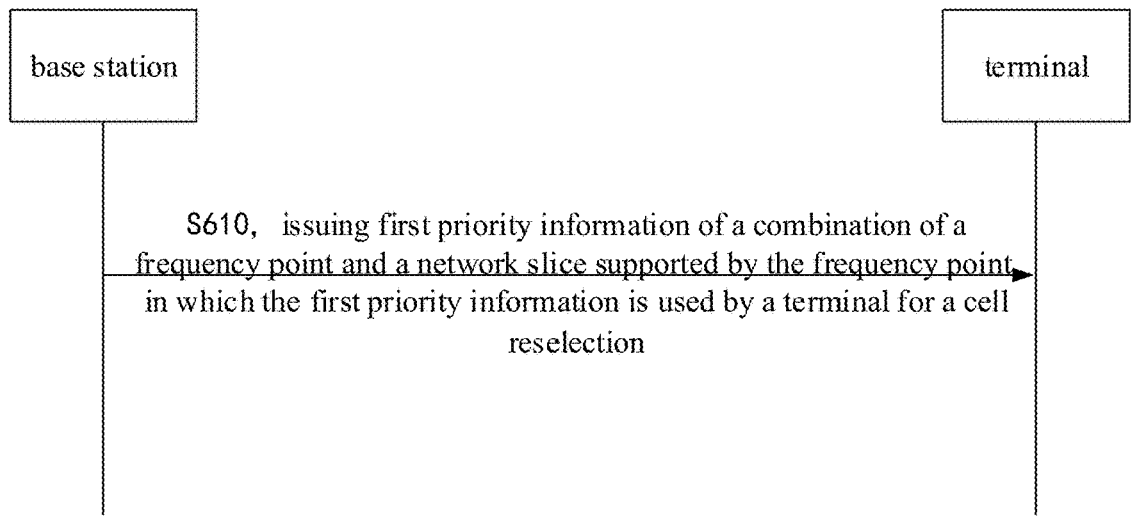
FIG. 6 is a flowchart illustrating an information transmission method according to an embodiment of the disclosure.

As illustrated in FIG. 6, an information transmission method is provided in the embodiments. The method is applied in a base station and includes the followings.

At block S610, first priority information of a combination of a frequency point and a network slice supported by the frequency point is issued. The first priority information is used by a terminal for a cell reselection.

In the embodiment of the disclosure, the base station may issue the first priority information which may be used by the terminal for the cell selection. Here, the first priority information is information for indicating a priority of the combination of a frequency point and a network slice supported by the frequency point.

In some embodiments, the method further includes broadcasting a first indication within a serving cell of the terminal. The first indication is configured to indicate whether system information broadcasted by the serving cell is capable of carrying slice information of a neighbor cell.

In the embodiment of the disclosure, the base station may broadcast the first indication within the serving cell of the terminal. The first indication is configured to inform the terminal whether the system information broadcast by the serving cell of the terminal carries the slice information. The slice information includes but is not limited to slice information of the network slice supported by the frequency point of the serving cell of the terminal and/or slice information of the network slice supported by the frequency point of the neighbor cell.

In some embodiments, the method further includes: after broadcasting the first indication, in response to the serving cell and the neighbor cell supporting different network slices, broadcasting the system information carrying the slice information of the neighbor cell by the serving cell. Here, the neighbor cell is a neighbor cell of the serving cell of the terminal.

If the base station broadcasts the first indication within the serving cell of the terminal, when the serving cell and the neighbor cell support different network slices, the system information carrying the slice information of the neighbor cell is broadcast by the serving cell.

In some embodiments, the method further includes: after broadcasting the first indication, in response to the serving cell and the neighbor cell supporting a same network slice, broadcasting no system information carrying the slice information of the network slice supported by the frequency point of the neighbor cell by the serving cell.

For example, in some embodiments, broadcasting the system information carrying the slice information of the neighbor cell by the serving cell includes at least one of: broadcasting intra-system intra-frequency cell reselection system information by the serving cell, in which the intra-system intra-frequency cell reselection system information carries slice information of an intra-system intra-frequency cell; broadcasting intra-system inter-frequency cell reselection system information broadcast by the serving cell, in which the intra-system inter-frequency cell reselection system information carries slice information of an intra-system inter-frequency cell; and broadcasting inter-system cell reselection system information broadcast by the serving cell, in which the inter-system cell reselection system information carries slice information of an inter-system cell.

In some embodiments, the method further includes: in response to a frequency point of the serving cell and the frequency point of the neighbor cell supporting different network slices, broadcasting a second indication within the serving cell.

When the frequency point of the serving cell and the frequency point of the neighbor cell support different network slices, the terminal is notified through the dedicated second indication. In this way, when the terminal receives the second indication, it may consider that the frequency point corresponding to the current resident serving cell and the frequency point corresponding to the neighbor cell adjacent to the serving cell support different network slices.

In some embodiments, block S610 may include issuing the first priority information in response to a tracking area update (TAU) of the terminal or a radio access network area update (RAU).

In this way, the first priority information is issued during a process of TAU or RAU, such that the first priority information is issued through dedicated signaling, which has a high compatibility with the prior art and saves signaling overhead.

In some embodiments, block S610 may include issuing radio source control (RRC) release information carrying the first priority information in response to the terminal releasing a RRC connection.

When the terminal releases the RRC connection so as to be switched from a connected state from an idle state or an inactive state, the terminal receives the RRC release information, and obtains the first priority information from the RRC release information.

In some embodiments, the method further includes: receiving second priority information of a network slice supported by the terminal; and determining the first priority information based on the second priority information.

The terminal reports information indicating a priority of its supported network slice (i.e., the second priority information) to the network side, and the base station at the network side may determine the first priority information based on the second priority information.

In some embodiments, the method further includes: issuing priority request information.

Receiving the second priority information of the network slice supported by the terminal includes receiving the second priority information reported based on the priority request information.

In some embodiments, the base station may issue the priority request information when a load is less than a predetermined value based on its own requirement, so as to instruct the terminal to report the second priority information of the network slice supported by the terminal.

In some other embodiments, the base station may not issue the priority request information, and the terminal may actively report (for example, push) the second priority information.

In some embodiments, receiving the second priority information of the network slice supported by the terminal includes receiving the second priority information reported after an update of a priority of the network slice supported by the terminal.

In some embodiments, the method further includes: receiving a third indication reported in response to an update of a priority of the network slice supported by the terminal or an expiration of a first timer.

Issuing the priority request information includes issuing the priority request information based on the third indication.

Figure 7:
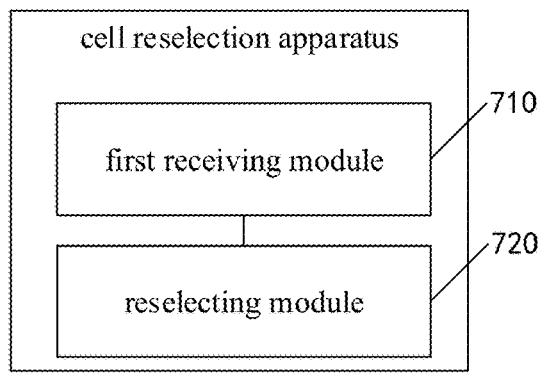
FIG. 7 is a block diagram illustrating a cell reselection apparatus according to an embodiment of the disclosure.

As illustrated in FIG. 7, a cell reselection apparatus is provided in the embodiments of the disclosure. The apparatus is applied in a terminal and includes a first receiving module 710 and a reselecting module 720.

The first receiving module 710 is configured to receive first priority information of a combination of a frequency point and a network slice supported by the frequency point.

The reselecting module 720 is configured to perform a cell reselection based on the first priority information.

In some embodiments, each of the first receiving module 710 and the reselecting module 720 may be a program module which may be executed by a processor to receive the first priority information and perform the cell reselection.

In some embodiments, each of the first receiving module 710 and the reselecting module 720 may be a software and hardware combined module, which includes but is not limited to a programmable array, including but be not limited to a complex programmable array or a field programmable array.

In further embodiments, each of the first receiving module 710 and the reselecting module 720 may be a pure hardware module, which may include an application-specific integrated circuit.

In some embodiments, the apparatus further includes a first determining module configured to determine the network slice supported by the frequency point based on slice information, in which the slice information includes single network slice selection auxiliary information, slice type information or service type information.

In some embodiments, the reselecting module 720 is configured to: for a reselection of an intra-system inter-frequency cell and an intra-system intra-frequency cell, determine a signal quality of each of the intra-system inter-frequency cell and the intra-system intra-frequency cell with a same priority based on the first priority information; and determine the intra-system inter-frequency cell or the intra-system intra-frequency cell with a maximum signal quality as a target cell in the cell reselection.

In some embodiments, the reselecting module 720 is configured to: for a reselection of an intra-system inter-frequency cell, an intra-system intra-frequency cell and an inter-system cell, determine based on the first priority information whether a cell with a priority higher than a priority of a serving cell of the terminal exists in the intra-system inter-frequency cell, the intra-system intra-frequency cell and the inter-system cell; and determine a cell with a priority higher than the priority of the serving cell of the terminal and a signal quality higher than a first threshold as a target cell in the cell reselection in response to existence of a cell with a priority higher than the priority of the serving cell of the terminal.

In some embodiments, the reselecting module 720 is configured to: for a reselection of an intra-system inter-frequency cell, an intra-system intra-frequency cell and an inter-system cell, determine based on the first priority information whether a cell with a priority higher than or equal to a priority of a serving cell of the terminal exists in the intra-system inter-frequency cell, the intra-system intra-frequency cell and the inter-system cell; and in response to inexistence of a cell with a priority higher than or equal to the priority of the serving cell of the terminal, when a signal quality of the serving cell is less than a second threshold and a cell with a signal quality higher than a third threshold exists in the intra-system inter-frequency cell, the intra-system intra-frequency cell and the inter-system cell, determine a cell with a signal quality higher than the third threshold as a target cell in the cell reselection.

In some embodiments, the reselecting module 720 is configured to: determine based on the first priority information whether a priority of a network slice supported by an intra-system intra-frequency cell is higher than a priority of a network slice supported by a serving cell of the terminal, in response to a signal quality of the serving cell being higher than a fourth threshold; perform a signal quality measurement on the intra-system intra-frequency cell in response to the priority of the network slice supported by the intra-system intra-frequency cell being higher than the priority of the network slice supported by the serving cell; and select the intra-system intra-frequency cell as a target cell in the cell reselection based on a result of the signal quality measurement.

In the some embodiments, the reselecting module 720 is configured to: determine based on the first priority information whether a priority of an intra-system inter-frequency cell and a priority of an inter-system cell is higher than a priority of a serving cell of the terminal, in response to a signal quality of the serving cell being higher than a fifth threshold; perform a signal quality measurement on the intra-system inter-frequency cell and the inter-system cell in response to the priority of the intra-system inter-frequency cell and the priority of the inter-system cell being higher than the priority of the serving cell; and select the intra-system inter-frequency cell or the inter-system cell with a higher signal quality as a target cell in the cell reselection based on a result of the signal quality measurement.

In the some embodiments, the apparatus further includes a measuring module is configured to perform no signal quality measurement on the intra-system inter-frequency cell or the inter-system cell in response to the priority of the intra-system inter-frequency cell and the priority of the inter-system cell being less than the priority of the serving cell.

In some embodiments, the first receiving module 710 is configured to receive system information broadcast by a serving cell of the terminal.

The apparatus further includes a third determining module configured to determine a network slice supported by a frequency point of a neighbor cell based on slice information of the neighbor cell carried in the system information.

In some embodiments, the first receiving module 710 is configured to perform at least one of: receiving intra-system intra-frequency cell reselection system information broadcast by the serving cell, in which the intra-system intra-frequency cell reselection system information carries slice information of an intra-system intra-frequency cell; receiving intra-system inter-frequency cell reselection system information broadcast by the serving cell, in which the intra-system inter-frequency cell reselection system information carries slice information of an intra-system inter-frequency cell; and receiving inter-system cell reselection system information broadcast by the serving cell, in which the inter-system cell reselection system information carries slice information of an inter-system cell.

In the some embodiments, the reselecting module 720 is configured to: determine an intra-system inter-frequency cell corresponding to the slice information carried in the system information as a candidate cell in the cell reselection based on the first priority information; and/or determine an inter-system cell corresponding to the slice information carried in the system information as a candidate cell in the cell reselection based on the first priority information.

In some embodiments, the first receiving module 710 is configured to receive a first indication broadcast by the serving cell, in which the first indication is configured to indicate whether the system information broadcast by the serving cell is capable of carrying the slice information, and the first priority information at least indicates a priority of a combination of the frequency point of the neighbor cell and the network slice supported by the frequency point of the neighbor cell.

The third determining module is configured to determine that the frequency point of the neighbor cell and the frequency point of the serving cell support a same network slice in response to receiving the first indication and the system information carrying no slice information of the neighbor cell.

In some embodiments, the first receiving module 710 is configured to receive a second indication broadcast by the serving cell in response to the serving cell supporting broadcasting of the second indication, in which the second indication is configured to indicate that the frequency point of the neighbor cell and the frequency point of the serving cell support different network slices. The third determining module is configured to determine the network slice supported by the frequency point of the neighbor cell based on the slice information of the neighbor cell carried in the system information in response to receiving the first indication and the second indication.

In some embodiments, the third determining module is configured to determine that the frequency point of the neighbor cell and the frequency point of the serving cell support a same network slice in response to not receiving the second indication.

For example, the third determining module is configured to determine that the frequency point of the neighbor cell and the frequency point of the serving cell support a same network slice in response to receiving a first broadcast, not receiving the second indication, and the system information not carrying the slice information of the neighbor cell.

In some embodiments, the third determining module is configured to determine the network slice supported by the frequency point of the neighbor cell without based on the system information, in response to the serving cell not supporting broadcasting of the second indication.

In some embodiments, the first receiving module 710 is configured to receive the first priority information in response to a tracking area update (TAU) of the terminal or a radio access network area update (RAU).

In some embodiments, the first receiving module 710 is configured to receive radio source control (RRC) release information carrying the first priority information in response to the terminal releasing a RRC connection.

In some embodiments, the apparatus further includes a reporting module configured to report a priority of a network slice supported by the terminal, in which the priority is configured to determine priority information of the frequency point and priority information of the network slice supported by the frequency point, or the priority is configured to determine the first priority information of the combination of the frequency point and the network slice supported by the frequency point.

In some embodiments, the apparatus further includes a fourth determining module configured to determine the second priority information of the network slice or a network slice group supported by the terminal based on a service occurring frequency on the network slice.

In some embodiments, the first receiving module 710 is configured to receive priority request information.

The reporting module is configured to report the second priority information of the network slice supported by the terminal based on the priority request information.

In some embodiments, the reporting module is configured to report updated second priority information of the network slice supported by the terminal in response to an update of a priority of the network slice supported by the terminal.

In some embodiments, the reporting module is configured to report a third indication in response to an update of a priority of the network slice supported by the terminal or an expiration of a first timer.

The first receiving module 710 is configured to receive the priority request information issued based on the third indication.

In some embodiments, the reporting module is configured to report the second priority information of the network slice supported by the terminal in response to an expiration of a second timer.

In some embodiments, the reporting module is configured to switch the terminal to a connected state in response to the terminal being in an idle state or an inactive state and an update of the priority of the network slice supported by the terminal; and report updated second priority information of the network slice supported by the terminal during the switching to the connected state.

In some embodiments, the reporting module is configured to report the updated second priority information of the network slice using a connection establish request message during the switching to the connected state, or report the updated second priority information of the network slice using a connection establish completion message during the switching to the connected state, or report the updated second priority information of the network slice using a connection recovery request message during the switching to the connected state, or report the updated second priority information of the network slice using a connection recovery completion message during the switching to the connected state.

Figure 8:
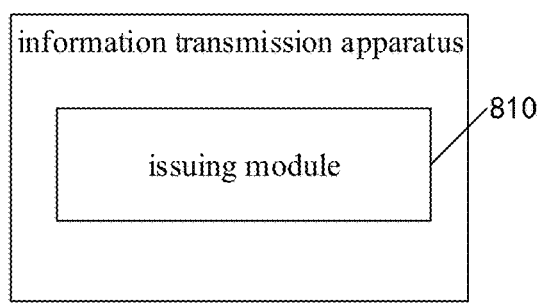
FIG. 8 is a block diagram illustrating an information transmission apparatus according to an embodiment of the disclosure.

As illustrated in FIG. 8, an information transmission apparatus is provided in the embodiments of the disclosure. The apparatus is applied in a base station and includes an issuing module 810.

The issuing module 810 is configured to issue first priority information of a combination of a frequency point and a network slice supported by the frequency point, in which the first priority information is used by a terminal for a cell reselection.

In some embodiments, the first issuing module 810 may be a program module which may be executed by a processor to issue the first priority information.

In some embodiments, the first issuing module 810 may be a software and hardware combined module, which includes but is not limited to a programmable array, including but be not limited to a complex programmable array or a field programmable array.

In further embodiments, the first issuing module 810 may be a pure hardware module, which may include an application-specific integrated circuit.

In some embodiments, the apparatus further includes a broadcasting module configured to broadcast a first indication within a serving cell of the terminal, in which the first indication is configured to indicate whether system information broadcasted by the serving cell is capable of carrying slice information of a neighbor cell, and the first priority information at least indicates a priority of a combination of a frequency point of the neighbor cell and a network slice supported by the frequency point of the neighbor cell.

In some embodiments, the broadcasting module is configured to: after broadcasting the first indication, in response to the serving cell and the neighbor cell supporting different network slices, broadcast the system information carrying the slice information of the neighbor cell by the serving cell. The slice information carried in the system information includes slice information of a network slice supported by a frequency point of the neighbor cell.

In some embodiments, the broadcasting module is configured to perform at least one of: broadcasting intra-system intra-frequency cell reselection system information by the serving cell, in which the intra-system intra-frequency cell reselection system information carries slice information of an intra-system intra-frequency cell; broadcasting intra-system inter-frequency cell reselection system information broadcast by the serving cell, in which the intra-system inter-frequency cell reselection system information carries slice information of an intra-system inter-frequency cell; and broadcasting inter-system cell reselection system information broadcast by the serving cell, in which the inter-system cell reselection system information carries slice information of an inter-system cell.

In some embodiments, the broadcasting module is configured to: after broadcasting the first indication, in response to the serving cell and the neighbor cell supporting a same network slice, broadcast by the serving cell no system information carrying the slice information of the network slice supported by the frequency point of the neighbor cell.

In some embodiments, the broadcasting module is configured to: in response to a frequency point of the serving cell and the frequency point of the neighbor cell supporting different network slices, broadcast a second indication within the serving cell.

In some embodiments, the issuing module 810 is configured to issue the first priority information in response to a tracking area update (TAU) of the terminal or a radio access network area update (RAU).

In some embodiments, the issuing module 810 is configured to issue radio source control (RRC) release information carrying the first priority information in response to the terminal releasing a RRC connection.

In some embodiments, the apparatus further includes a second receiving module and a priority module.

The second receiving module is configured to receive second priority information of a network slice supported by the terminal.

The priority module is configured to determine the first priority information based on the second priority information.

In some embodiments, the issuing module 810 is configured to issue priority request information.

The second receiving module is configured to receive the second priority information reported based on the priority request information.

In some embodiments, the second receiving module is configured to receive the second priority information reported after an update of a priority of the network slice supported by the terminal.

In some embodiments, the second receiving module is configured to receive a third indication reported in response to an update of a priority of the network slice supported by the terminal or an expiration of a first timer.

The issuing module 810 is configured to issue the priority request information based on the third indication.

In some embodiments, the second receiving module is configured to receive the second priority information of the network slice supported by the terminal.

The embodiments of the disclosure further provide a communication device including an antenna, a memory and a processor. The processor is coupled to the antenna and the memory respectively, and configured to execute executable programs stored in the memory to control the antenna to receive and send wireless signals and perform the cell reselection method or the information transmission method according to any of the above-mentioned embodiments.

The communication device provided in the embodiment may be the terminal or the base station described above. The terminal may be various manned terminals or vehicle-mounted terminals. The base station may be any kind of base station, for example the 4G base station or 5G base station.

The antenna may be any kind of antenna, for example a mobile antenna such as the 3G antenna, 4G antenna or 5G antenna. The antenna may further include the WiFi antenna or the wireless charging antenna.

The memory may be any kind of storage medium. The storage medium may be a non-transitory computer storage medium, which may continually memory information stored thereon after the communication device is powered off.

The processor may be coupled to the antenna and the memory via the bus, configured to read executable programs storage on the memory to implement the cell reselection method or the information transmission method as illustrated in FIG. 3, FIG. 5 and/or FIG. 6.

The embodiments of the disclosure provide a non-transitory computer storage medium. The non-transitory computer storage medium stores with executable programs. The executable programs are executed by a processor, and steps of the cell reselection method or the information transmission method provided in any of the aforementioned embodiments can be implemented, for example at least one of the methods described with reference to FIG. 3, FIG. 5 and/or FIG. 6 can be implemented.

An information processing method is provided in combination of any of the embodiments.

The method includes: UE receiving priority information of a combination of a frequency and a slice supported by the frequency issued by a base station through a dedicated signaling, and the UE determining a cell reselection priority and performing a cell reselection based on the priority information.

For example, a priority of the combination of a frequency and a network slice is indicated by first priority information. For example, a comparison example of a priority of a combination of a frequency and a network slice supported by the frequency is described as follows.

f1+network slice 1+network slice 2>f2+network slice 1=f1+network slice 1>f1+network slice 2=f2+network slice 2. It means that a priority of the frequency point f1 supporting the network slice 1 and the network slice 2 is higher than a priority of the frequency point f2 merely supporting the network slice 1, and a priority of the frequency point f2 merely supporting the network slice 1 is equal to a priority of the frequency point f1 merely supporting the network slice 1, and so on. If the network slice information is not indicated for some frequency points, for example f2>f1+ network slice 1, representing that a cell under the frequency f2 searched for the UE has a priority higher than a cell under f2>f1+network slice 1.

In some cases, the slice information may be identified by S-NSSAI, or by SST (slice/service type) in S-NSSAI.

In some cases, for a reselection of an intra-system intra-frequency cell and an intra-system inter-frequency cell, for the cells with the same priority of frequency+network slice, the UE sorts the cells based on the signal quality and then performs the cell reselection. Here, the priority of frequency+network slice refers to the priority of the combination of the frequency and the network slice supported by the frequency.

In some cases, for a selection of an intra-system intra-frequency (intra-freq) cell, an intra-system inter-frequency (inter-freq) cell and an inter-system (inter-RAT) cell, if a priority of a certain frequency+network slice is higher than the priority of the frequency+network slice of the serving cell, and under the certain frequency+network slice, there is a cell having a signal quality higher than a certain threshold, the UE reselects the frequency+network slice.

In some cases, for a selection of an intra-freq cell, an inter-freq cell and an inter-RAT cell, if a priority of a certain frequency+network slice is lower than the priority of the frequency+network slice of the serving cell, the signal quality of the serving cell is less than a certain threshold, and under the certain frequency+network slice, there is a cell having a signal quality higher than the certain threshold, the UE reselects the frequency+network slice.

In some embodiments, the UE receives a correspondence table between (a) serving cells and (b) network slices supported by a frequency and/or a neighbor cell of the frequency broadcast by the base station. The UE determines the serving cell and the network slice supported by the frequency and/or the neighbor cell of the frequency based on the correspondence table.

For an intra-freq cell, for example, a list of network slices supported by the neighbor cell is indicated in an intra-system intra-frequency cell list (intraFreqNeighCellList) of SIB3.

For an inter-freq cell, for example, a list of network slices supported by the frequency is indicated in intra-system inter-frequency cell information (InterFreqCarrierFreqInfo) of SIB4, or a list of network slices supported by the neighbor cell is indicated in intra-system inter-frequency cell information (InterFreqNeighCellInfo) in intra-system inter-frequency cell carrier frequency information (InterFreqCarrierFreqInfo). The list of network slices supported by the frequency refers to that all cells under the frequency support the list of network slices.

For an inter-RAT cell, for example, a list of network slices supported by the frequency is indicated in carrier frequency information (CarrierFreqEUTRA) of SIB5, or a list of network slices supported by the neighbor cell is indicated in neighbor cell frequency information (EUTRA-FreqNeighCellInfo) in CarrierFreqEUTRA.

In some embodiments, if the signal quality of the serving cell is higher than a certain threshold, and there is no neighbor cell with a priority higher than the priority of the serving cell and its supported network slice in the intra-freq neighbor cell and its corresponding network slice indicated by the system information, the UE may not perform the intra-freq measurement, or else the UE needs to perform the intra-freq measurement.

In some embodiments, if the signal quality of the serving cell is higher than a certain threshold, and there is no frequency point+its supported network slice with a priority higher than the priority of the frequency point+network slice corresponding to the serving cell in the inter-freq or inter-RAT frequency point and its corresponding network slice indicated by the system information, the UE may not perform the inter-freq or inter-RAT measurement on the frequency point.

In some other implementations, the UE receives an indication indicating whether to support broadcasting of a network slice broadcast by the base station, the UE determines based on the indication whether the base station supports broadcasting of the serving cell and the network slice supported by the frequency point and/or the neighbor cell of the frequency point.

In some cases, if the base station broadcasts the indication indicating that the broadcasting of the network slice is supported, if the serving cell indicated in the system information does not indicate the supported network slice, or the frequency point (if the frequency point does not indicate a neighbor cell) indicated in the system information does not indicate the supported network slice, or the neighbor cell of the frequency point and the frequency point indicated in the system information do not indicate the supported network slice, then it is considered that the frequency point or the neighbor cell supports the same network slice as the serving cell.

In some cases, if the base station broadcasts the indication indicating that the broadcasting of the network slice is not supported, the UE cannot determine based on the system information the network slice of the frequency point and the neighbor cell.

In some embodiments, when the UE performs TAU/RAU, the network sends updated priority information of the combination of a frequency and a slice (network slice) supported by the frequency.

The updated priority information may be sent through the RRC release message as follows.

The UE receives the indication indicating whether there is a neighbor cell having a network slice different from a network slice of the serving cell broadcast by the base station. If the indication indicates that there is no neighbor cell having a network slice different from a network slice of the serving cell, the UE considers that the network slice of each neighbor cell is the same as the network slice of the serving cell. If the indication indicates that there is a neighbor cell having a network slice different from a network slice of the serving cell, the frequency point (if the frequency point does not indicate the neighbor cell) indicated in the system information does not indicate the corresponding network slice, or the neighbor cell of the frequency point and/or the frequency point indicated in the system information does not indicate the corresponding network slice, it can be considered that the frequency point or the neighbor cell has the same the network slice as the serving cell.

In some cases, if the base station does not broadcast the indication indicating whether there is a neighbor cell having a network slice different from a network slice of the serving cell, the UE cannot determine based on the system information the network slice of the frequency point and the neighbor cell.

In some cases, the UE indicates to the base station priority information of a network slice or a network slice group.

For example, the UE supports network slices A, B and C, the UE may indicate that, network slice A+B>network slice A>network slice B. The network may configure the priority of frequency+network slice for the UE based on the priority information.

The UE may determine the priority of the network slice based on an occurring frequency of each of the network slice A, B and C. For example, if, for the service occurring frequency, network slice A>network slice B>network slice C, then the priority of the network slice can be determined as: network slice A+B>network slice A>network slice B>network slice C.

The priority of the frequency supporting the network slice or the network slice group of high priority is higher than a priority of the frequency supporting the network slice or the network slice group of low priority.

In some cases, the UE receives priority request information of the network slice sent by the base station to the UE before indicating to the base station priority information of a network slice or a network slice group.

In some cases, before sending the priority request information of the network slice to the UE, the base station may receive an indication indicated by the UE whether there is priority information of the network slice.

The UE may send the indication when the priority information of the network slice needs to be updated.

In some cases, the base station may configure a timer to restrict a frequency that the UE sends the message. Once the message is sent, the timer is started, and the message cannot be sent longer before the timer expires.

In some cases, after an update of the priority information of the network slice, the UE in the idle state or the inactive state may initiate a connection establish or recovery procedure, so as to indicate that there is the priority information of the network slice, so that the network may obtain updated priority information.

The indication can be carried through a connection establish request/completion message, a connection recovery request/completion message.

Figure 9:
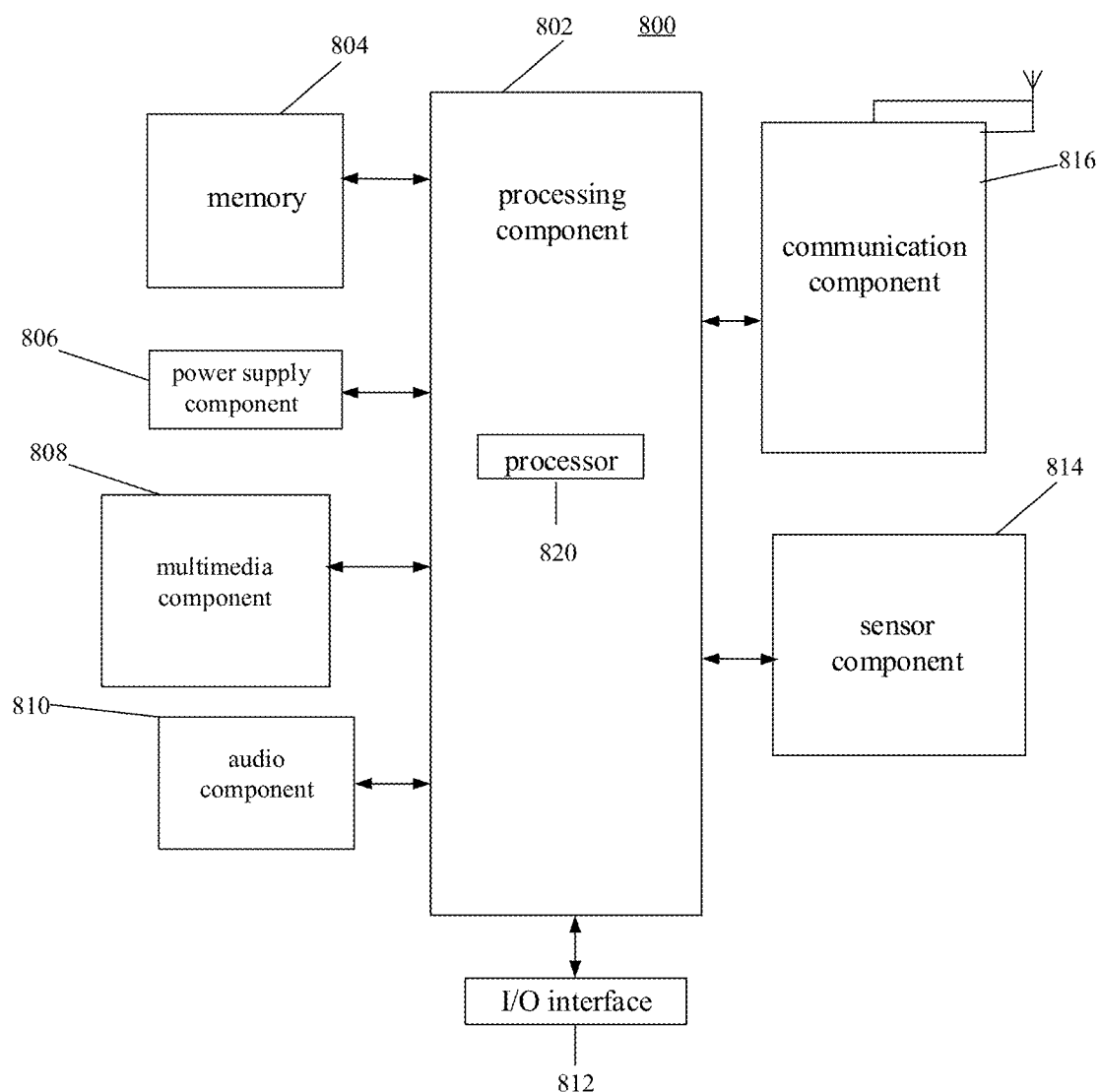
FIG. 9 is a schematic diagram illustrating a terminal according to an embodiment of the disclosure.

FIG. 9 is a block diagram illustrating a terminal 800. The embodiments of the disclosure provide the terminal 800. For example, the terminal 800 may be a mobile phone, a computer, a digital broadcasting UE, a messaging device, a game console, a tablet device, a medical equipment, a fitness equipment, a personal digital assistant, and so on.

Referring to FIG. 9, the terminal 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the terminal 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the terminal 800. Examples of the data include the instructions of any applications or methods operated on the terminal 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the terminal 800. The power supply component 806 may include a power supply management system, one or more power supplies, and other units related to generating, managing and distributing power for the terminal 800.

The multimedia component 808 includes an output interface screen provided between the terminal 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the terminal 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the terminal 800 is in an operation mode, such as a call mode, a record mode, and a speech recognition mode, the microphone is configured to receive the external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the terminal 800. For example, the sensor component 814 may detect the on/off state of the terminal 800 and the relative positioning of the component. For example, the component is a display and a keypad of the terminal 800. The sensor component 814 may further detect the location change of the terminal 800 or one component of the terminal 800, the presence or absence of contact between the user and the terminal 800, the orientation or acceleration/deceleration of the terminal 800, and the temperature change of the terminal 800. The sensor component 814 may include a proximity sensor configured to detect the existence of the objects nearby without any physical contact. The sensor component 814 may further include a light sensor such as a complementary metal oxide semiconductor (CMOS) or a charge-coupled device (CCD) image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the terminal 800 and other devices. The terminal 800 may access wireless networks based on communication standard, such as Wi-Fi, 2G or 3G, or their combination. In an embodiment, the communication component 816 receives broadcast signals or broadcast-related information from an external broadcast management system via a broadcast channel. In an embodiment, the communication component 816 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the terminal 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes executable instructions, such as the memory 804 including executable instructions, the executable instructions may be executed by the processor 820 of the terminal 800 to complete the above methods. For example, the non-transitory computer-readable storage medium may be a ROM, a random access memory (RAM), a CD-ROM, a magnetic tape, a floppy disk, an optical data storage device, etc.

The terminal may be used to implement the methods described above, for example, the methods described with reference FIG. 3, FIG. 5 and/or FIG. 6.

Figure 10:
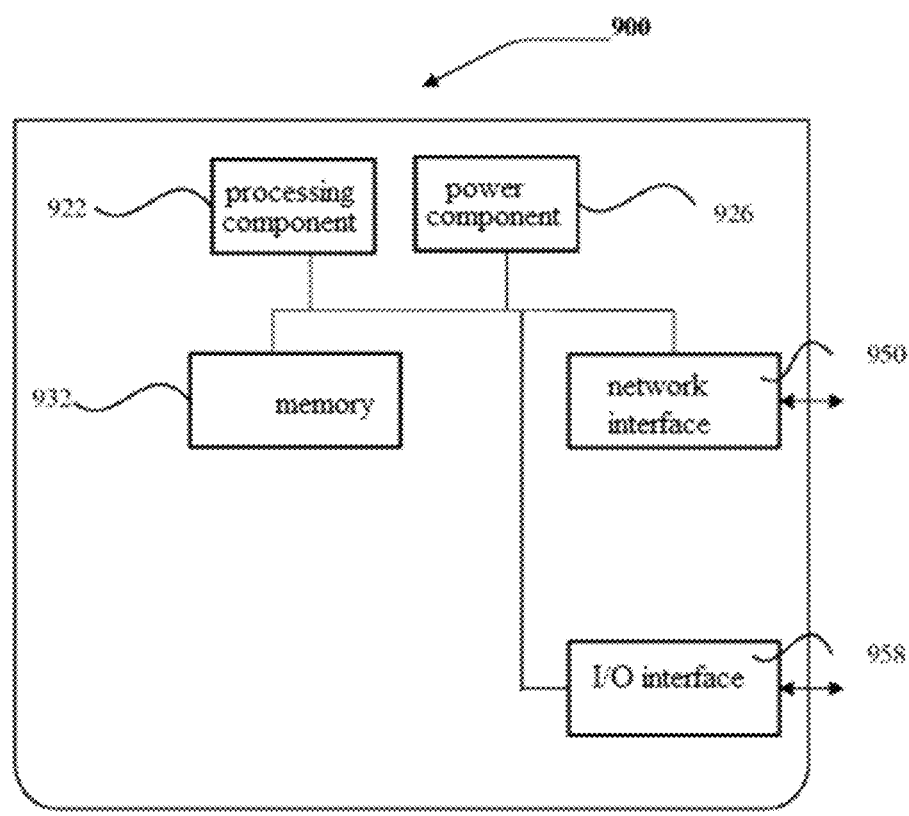
FIG. 10 is a schematic diagram illustrating a base station according to an embodiment of the disclosure.

FIG. 10 is a block diagram illustrating a base station 900 according to an embodiment. The base station 900 may be provided as a network side device. As illustrated in FIG. 10, the base station 900 includes a processing component 922, which further includes one or more processors, and a memory resource represented by a memory 932, for storing instructions executable by the processing component 922, such as an application program. The application program stored in the memory 932 may include one or more modules each corresponding to a set of instructions. In addition, the processing component 922 is configured to execute the instructions to perform any of the methods described with reference to FIG. 3, FIG. 5 and/or FIG. 6.

The base station 900 may also include a power component 926 configured to perform power management of the base station 900, a wired or wireless network interface 950 configured to connect the base station 900 to a network, and an input output (I/O) interface 958. The base station 900 can operate based on an operating system stored in the memory 932, such as Windows Server™, Mac OS X™, Unix™, Linux™, FreeBSD™ or the like.

The wireless network interface 950 includes but is not limited to the antenna in the above described communication device. After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

What is claimed is:

1. A cell reselection method, performed by a terminal, comprising:
   receiving first priority information of a combination of a frequency point and a network slice supported by the frequency point; and
   performing a cell reselection based on the first priority information at least in part by:
   for a reselection of an intra-system inter-frequency cell, an intra-system intra-frequency cell and an inter-system cell, determining based on the first priority information whether a cell with a priority higher than or equal to a priority of a serving cell of the terminal exists in the intra-system inter-frequency cell, the intra-system intra-frequency cell and the inter-system cell; and in response to inexistence of a cell with a priority higher than or equal to the priority of the serving cell of the terminal, when a signal quality of the serving cell is less than a second threshold and a cell with a signal quality higher than a third threshold exists in the intra-system inter-frequency cell, the intra-system intra-frequency cell and the inter-system cell, determining a cell with a signal quality higher than the third threshold as a target cell in the cell reselection.

2. The method of claim 1, further comprising:
determining the network slice supported by the frequency point based on slice information, wherein the slice information comprises at least one of single network slice selection auxiliary information, slice type information, and service type information.

3. The method of claim 1, wherein, performing the cell reselection based on the first priority information comprises,
for a reselection of an intra-system inter-frequency cell and an intra-system intra-frequency cell, determining a signal quality of each of the intra-system inter-frequency cell and the intra-system intra-frequency cell with a same priority based on the first priority information; and
determining a target cell in the cell reselection as the cell, of the intra-system inter-frequency cell and the intra-system intra-frequency cell, having a higher signal quality.

4. The method of claim 1, wherein, performing the cell reselection based on the first priority information comprises:
for a reselection of an intra-system inter-frequency cell, an intra-system intra-frequency cell, and an inter-system cell, determining based on the first priority information whether a cell with a priority higher than a priority of a serving cell of the terminal exists in the intra-system inter-frequency cell, the intra-system intra-frequency cell and the inter-system cell; and
determining a cell with a priority higher than the priority of the serving cell of the terminal and a signal quality higher than a first threshold as target cell in the cell reselection in response to existence of a cell with a priority higher than the priority of the serving cell of the terminal.

5. The method of claim 1, wherein, performing the cell reselection based on the first priority information comprises:
in response to a signal quality of the serving cell being higher than a fourth threshold, determining, based on the first priority information, whether a priority of a network slice supported by an intra-system intra-frequency cell is higher than a priority of a network slice supported by a serving cell of the terminal;
performing a signal quality measurement on the intra-system intra-frequency cell in response to the priority of the network slice supported by the intra-system intra-frequency cell being higher than the priority of the network slice supported by the serving cell; and
selecting the intra-system intra-frequency cell as a target cell in the cell reselection based on a result of the signal quality measurement.

6. The method of claim 1, wherein, performing the cell reselection based on the first priority information comprises:
determining, based on the first priority information, whether a priority of an intra-system inter-frequency cell and a priority of an inter-system cell is higher than a priority of a serving cell of the terminal, in response to a signal quality of the serving cell being higher than a fifth threshold;
performing a signal quality measurement on the intra-system inter-frequency cell and the inter-system cell in response to the priority of the intra-system inter-frequency cell and the priority of the inter-system cell being higher than the priority of the serving cell; and
selecting a target cell in the cell reselection as the cell, of the intra-system inter-frequency cell and the inter-system cell, having a higher measured signal quality.

7. The method of claim 1, further comprising:
receiving system information broadcast by a serving cell of the terminal; and
determining a network slice supported by a frequency point of a neighbor cell based on slice information of the neighbor cell carried in the system information, wherein the first priority information at least indicates a priority of a combination of the frequency point of the neighbor cell and the network slice supported by the frequency point of the neighbor cell.

8. The method of claim 7, wherein, performing the cell reselection based on the first priority information comprises at least one of:
determining an intra-system inter-frequency cell corresponding to the slice information carried in the system information as a candidate cell in the cell reselection based on the first priority information;
and
determining an inter-system cell corresponding to the slice information carried in the system information as a candidate cell in the cell reselection based on the first priority information.

9. The method of claim 7, further comprising:
receiving a first indication broadcast by the serving cell, wherein the first indication is configured to indicate whether the system information broadcast within by the serving cell is capable of carrying the slice information;
wherein determining the network slice supported by the frequency point of the neighbor cell based on the slice information carried in the system information comprises:
determining that the frequency point of the neighbor cell and the frequency point of the serving cell support a same network slice in response to receiving the first indication and the system information carrying no slice information of the neighbor cell.

10. The method of claim 9, further comprising:
receiving a second indication broadcast by the serving cell in response to the serving cell supporting broadcasting of the second indication, wherein the second indication is configured to indicate that the frequency point of the neighbor cell and the frequency point of the serving cell support different network slices;
wherein determining the network slice supported by the frequency point of the neighbor cell based on the slice information carried in the system information comprises:
determining the network slice supported by the frequency point of the neighbor cell based on the slice information of the neighbor cell carried in the system information in response to receiving the first indication and the second indication.

11. The method of claim 10, further comprising:
determining that the frequency point of the neighbor cell and the frequency point of the serving cell support a same network slice in response to not receiving the second indication.

12. The method claim 1, wherein, receiving the first priority information of a combination of a frequency point and a network slice supported by the frequency point comprises:
receiving the first priority information in response to a tracking area update (TAU) of the terminal or a radio access network area update (RAU).

13. The method of claim 1, wherein, receiving the first priority information of a combination of a frequency point and a network slice supported by the frequency point comprises:
receiving radio source control (RRC) release information carrying the first priority information in response to the terminal releasing a RRC connection.

14. The method of claim 1, further comprising:
reporting second priority information of a network slice supported by the terminal, wherein the second priority information is configured to determine one of (i) a priority of the frequency point and a priority of the network slice supported by the frequency point (ii) a priority of the combination of the frequency point and the network slice supported by the frequency point.

15. The method of claim 14, further comprising:
determining the second priority information of the network slice or a network slice group supported by the terminal based on a service occurring frequency on the network slice.

16. The method of claim 14, further comprising:
receiving priority request information;
wherein reporting the second priority information of the network slice supported by the terminal comprises:
reporting the second priority information of the network slice supported by the terminal based on the priority request information.

17. The method of claim 16, further comprising:
reporting a third indication in response to an update of a priority of the network slice supported by the terminal or an expiration of a first timer;
wherein receiving the priority request information comprises:
receiving the priority request information issued based on the third indication.

18. The method of claim 14, wherein, reporting the second priority information of the network slice supported by the terminal comprises:
reporting the second priority information of the network slice supported by the terminal in response to an update of a priority of the network slice supported by the terminal or an expiration of a second timer.

19. The method of claim 14, wherein, reporting the second priority information of the network slice supported by the terminal comprises:
switching the terminal to a connected state in response to the terminal being in an idle state or an inactive state and the priority of the network slice supported by the terminal being updated; and
reporting updated second priority information of the network slice supported by the terminal during the switching to the connected state.

20. An information transmission method, performed by a base station, comprising:
issuing first priority information of a combination of a frequency point and a network slice supported by the frequency point, wherein the first priority information is used by a terminal for a cell reselection and
performing a cell reselection based on the first priority information at least in part by:
for a reselection of an intra-system inter-frequency cell, an intra-system intra-frequency cell and an inter-system cell, determining based on the first priority information whether a cell with a priority higher than or equal to a priority of a serving cell of the terminal exists in the intra-system inter-frequency cell, the intra-system intra-frequency cell and the inter-system cell; and
in response to inexistence of a cell with a priority higher than or equal to the priority of the serving cell of the terminal, when a signal quality of the serving cell is less than a second threshold and a cell with a signal quality higher than a third threshold exists in the intra-system inter-frequency cell, the intra-system intra-frequency cell and the inter-system cell, determining a cell with a signal quality higher than the third threshold as a target cell in the cell reselection.

21. The method of claim 20, further comprising:
broadcasting a first indication within a serving cell of the terminal, wherein the first indication is configured to indicate whether system information broadcasted within by the serving cell is capable of carrying slice information of a neighbor cell, and the first priority information at least indicates a priority of a combination of a frequency point of the neighbor cell and a network slice supported by the frequency point of the neighbor cell.

22. The method of claim 21, further comprising:
after broadcasting the first indication, in response to the serving cell and the neighbor cell supporting different network slices, broadcasting the system information carrying the slice information of the neighbor cell within by the serving cell.

23. The method of claim 21, further comprising:
in response to a frequency point of the serving cell and the frequency point of the neighbor cell supporting different network slices, broadcasting a second indication within the serving cell, wherein the system information is configured to carry the slice information of the neighbor cell after broadcasting of the first indication and the second indication.

24. A communication device, comprising:
an antenna;
a memory;
a processor, coupled to the antenna and the memory respectively, and configured to execute executable programs stored in the memory to control the antenna to receive and send wireless signals and:
receive first priority information of a combination of a frequency point and a network slice supported by the frequency point; and
perform a cell reselection based on the first priority information at least in part by:
for a reselection of an intra-system inter-frequency cell, an intra-system intra-frequency cell and an inter-system cell, determining based on the first priority information whether a cell with a priority higher than or equal to a priority of a serving cell of the communication device exists in the intra-system inter-frequency cell, the intra-system intra-frequency cell and the inter-system cell; and in response to inexistence of a cell with a priority higher than or equal to the priority of the serving cell of the communication device, when a signal quality of the serving cell is less than a second threshold and a cell with a signal quality higher than a third threshold exists in the intra-system inter-frequency cell, the intra-system intra-frequency cell and the inter-system cell, determining a cell with a signal quality higher than the third threshold as a target cell in the cell reselection.

* * * * *